United States Patent
Coulon et al.

[15] 3,698,274
[45] Oct. 17, 1972

[54] APPARATUS FOR PIERCING OPENINGS IN TUBING

[72] Inventors: Edward I. Coulon, Twin Lakes, Wis.; Benny Jay Miller, Elmhurst; Dale C. Mohr, Addison, both of Ill.

[73] Assignee: Vogel Tool and Die Corporation, Stone Park, Ill.

[22] Filed: May 14, 1971

[21] Appl. No.: 143,315

[52] U.S. Cl. ..........................83/188, 83/54, 83/453, 83/685
[51] Int. Cl. ..............................................B23d 21/14
[58] Field of Search..........83/180, 188, 453, 459, 34, 83/685

[56] References Cited

UNITED STATES PATENTS

| | | | |
|---|---|---|---|
| 3,295,347 | 1/1967 | Fuessle et al. | 83/54 X |
| 3,259,003 | 7/1966 | Griffin | 83/54 |
| 2,829,983 | 4/1958 | De Gain | 83/188 X |
| 252,247 | 1/1882 | Olmsted | 83/180 X |

FOREIGN PATENTS OR APPLICATIONS

| | | | |
|---|---|---|---|
| 561,602 | 5/1944 | Great Britain | 83/188 |

*Primary Examiner*—Andrew R. Juhasz
*Assistant Examiner*—W. Donald Bray
*Attorney*—Richard J. Myers

[57] ABSTRACT

A tube piercing apparatus includes mandrel members positioned within the tube for supporting the inner wall of the tube. The tube is positioned on a supporting member having an arcuate seat. One of the mandrel members includes an inner wedge shaped surface. Wedge means is movable into engagement with the inner surface to spread the mandrel members apart against the inner wall of the tube. One of the mandrel members includes a bore and cutting edge which cooperates with a preparing punch for cutting openings in the wall of the tube.

7 Claims, 2 Drawing Figures

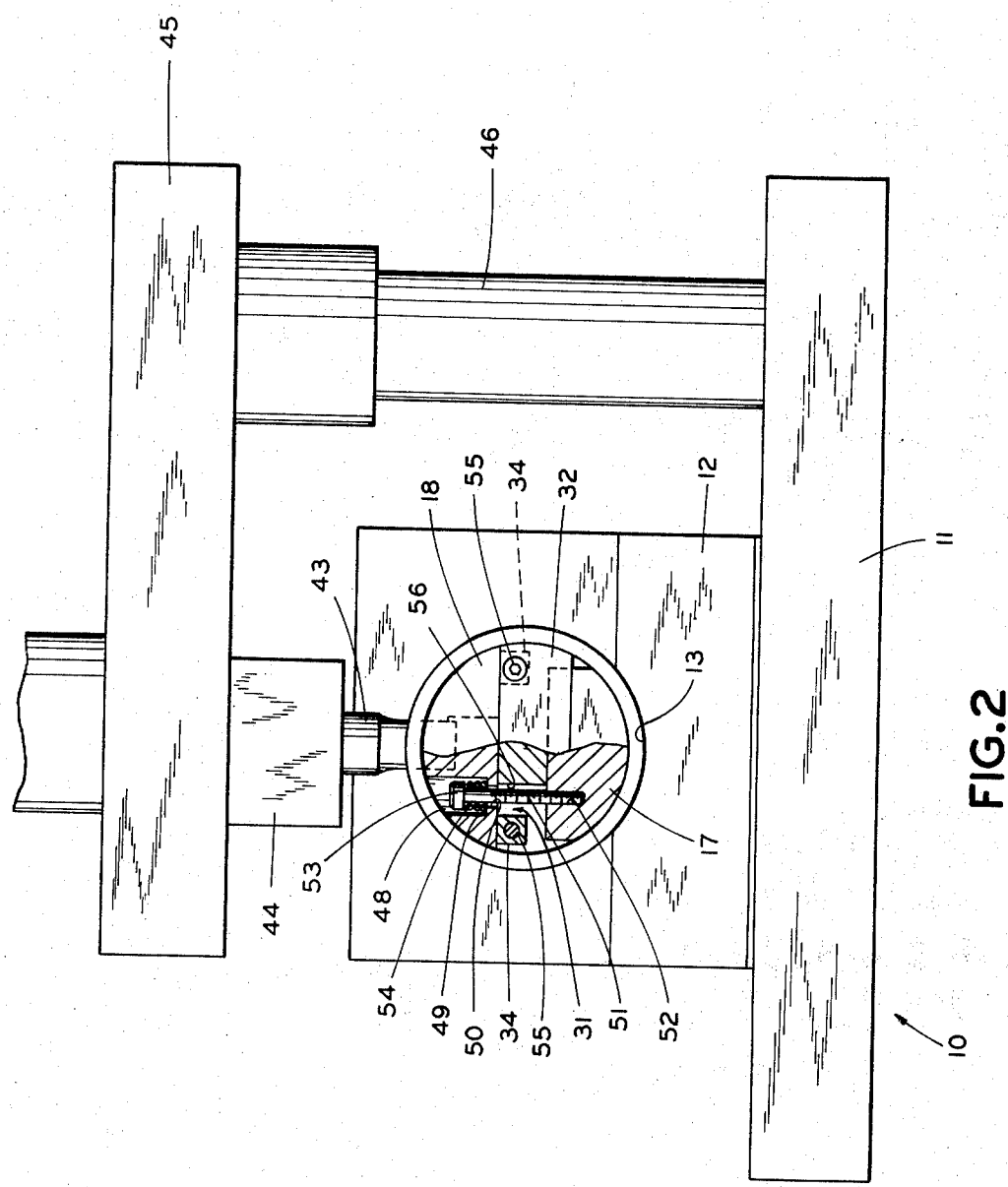

APPARATUS FOR PIERCING OPENINGS IN TUBING

BACKGROUND OF THE INVENTION

1. Field of the Invention

The field of invention is in tubular piercing dies and apparatus. 2. Description of the Prior Art been In piercing of holes in the wall of tubing it has be-n common to support a mandrel within the tube which is provided with a transverse bore having a cutting edge. A piercing punch is positioned to be forced into cutting engagement with the tube wall and cuts through the wall as it cooperates with the cutting edge. The mandrel members support the tube against collapse, but since a mandrel must be of a particular size conforming to the inner diameter of the tube, it has been necessary to replace the mandrel each time a different diameter tube is to be pierced. The problem of changing mandrels for each diameter tube has been eliminated in the present invention.

SUMMARY

The prime object of the present invention is to provide a tube piercing apparatus which can be utilized to pierce holes in the wall of tubing of several diameters without the necessity of changing mandrels. This is achieved by the utilization of a split mandrel which includes spring biasing means normally urging the mandrel to a collapsed position within the wall of a tube. One of the mandrels includes an inner surface providing a wedge configuration. A wedge shaped member is movable by means of a fluid extensible device to wedge or force apart the mandrel members into supporting engagement with the inner tube wall. One of the mandrels is provided with a bore and cutting edge through which a punching member is moved for cutting or piercing a hole within the wall of the tube.

BRIEF DESCRIPTION OF THE DRAWINGS

FIG. 2, is a front elevational, partly in cross-section, view of the apparatus disclosed in FIG. 1.

Figure 1:
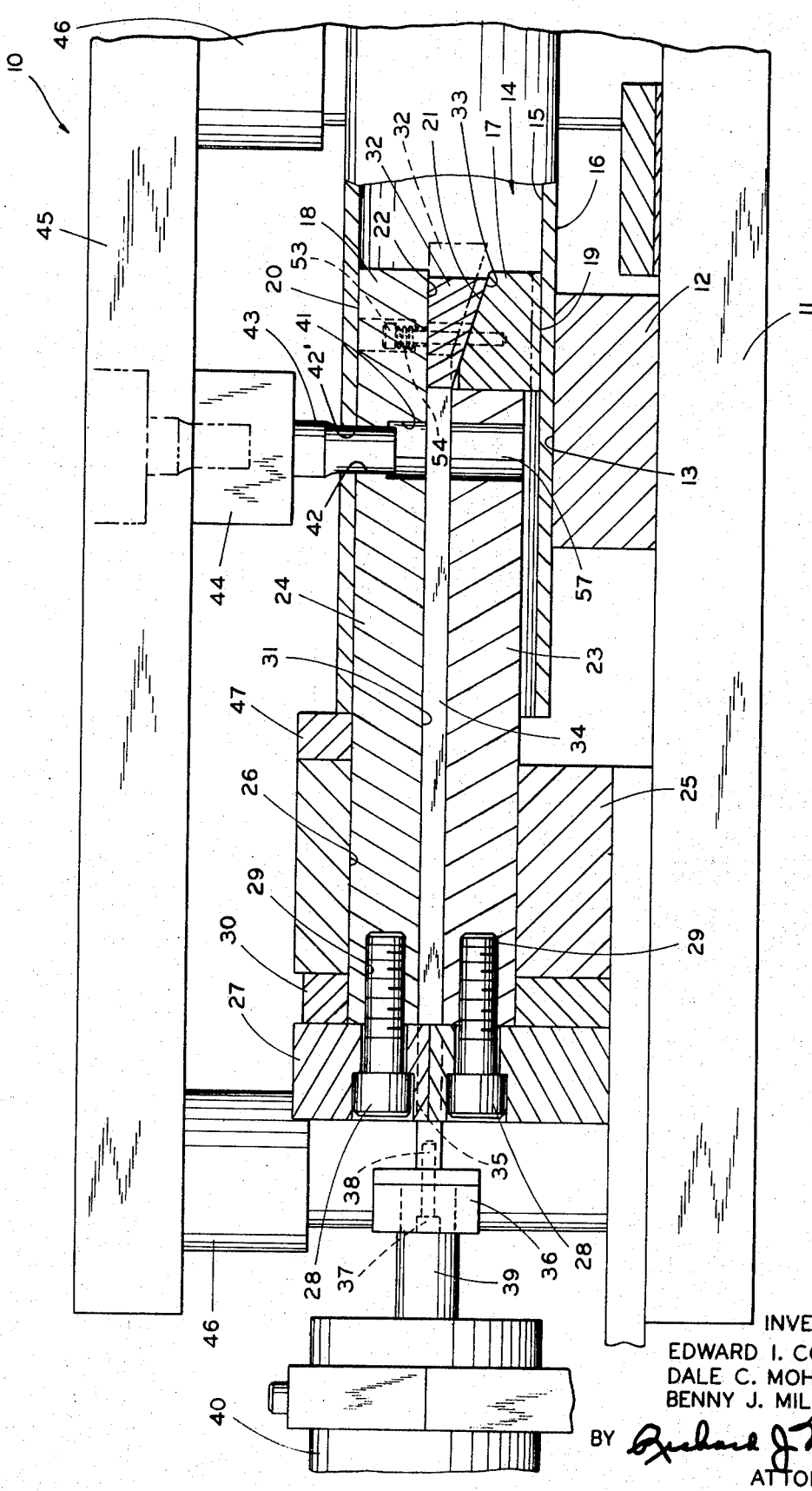
FIG. 1 is a side elevational, partially in cross-section, view of the tube piercing apparatus.

DESCRIPTION OF THE PREFERRED EMBODIMENT a tube piercing apparatus is generally designated by the reference character 10 and includes a base 11 which may be the platen of a conventional punch press (not shown). The apparatus 10 includes a lower supporting block 12 having an arcuate supporting surface 13, on which a tube 14 is carried and supported. The tube 14 includes an inner diameter surface 15 and an outer diameter surface 16 which is disclosed in position on the apparatus 10 preparatory for a piercing or punching operation.

A lower mandrel member 17 and upper mandrel member 18 is positioned within the tube 14 and respectively includes upper and lower outer cylindrical surfaces adapted to engage the inner diameter surface 15. The mandrel members 17 and 18 respectively include an inner tapering surface 21 and a flat surface 22. The lower mandrel member 17 is suitably connected to an extension 23 and the upper mandrel member is connected to an extension 24 which in turn have their ends supported on a supporting block 25. The block 25 is provided with a bore 26 accommodating the cylindrical surfaces 19 and 20. An end block 27 is connected by means of cap screws 28 and threaded bores 29 to the block 25. The block 25 and block 12 are rigidly supported on the base 11 by suitable means. A spacer ring 30 is secured between the blocks 27 and 25.

The upper and lower mandrel members 17–18 and extensions 23–24 are spread apart to provide a space 31. A wedge block 32 is disposed between mandrel members 17–18 and includes a wedge or tapered surface 33 slidable on the surface 21. A pair of spaced arms 34 are connected to the wedge block 32 and extend longitudinally within the space 31 and through an opening 35 provided in block 27. A cross-head 36 connects both arms 34 by means of cap screws 37, said cross-head 36 being suitably connected to a ram 39 of a fluid extensible device 40 which in this invention may be an air operated piston ram and cylinder assembly.

A vertical bore 41 is provided in the upper mandrel member 18 and opens into the space 31. The bore 41 communicates with a reduced diameter bore 42 which has its upper end terminate in a cutting edge 42'. A punch 43 is shown having been moved through the wall of the tube and having cut a hole therein. The punch 43 is carried by means of a block 44 which is suitably connected to a plate 45 guided by means of liner pin assemblies 46 also connected to platen or base 12. The plate 45 is adapted to be suitably connected to the ram of a punch press in conventional manner. A stop 47 is engaged by the end of the tube 14 and a plurality of such stops may be provided to accommodate different longitudinal locations at holes to be pierced as desired, said additional stops (which are not shown) being longitudinally spaced along the apparatus. The upper mandrel member 18 is provided with a pair of bores 48, only one of which is shown in FIG. 2 and, each of which are disposed on opposite sides of a vertical center line of the punch 43. Each bore 48 is provided at its lower end with a shoulder 49 and a reduced bore 50. A cap screw 51 extends through each reduced bore 50 and through the space 31 into a threaded bore 52 provided in the lower mandrel member 17. Each cap screw includes a head 53 which holds captive a spring 54 against each shoulder 49.

The wedge block 32 is secured to the arms 34 by means of cap screws 55. The block 32 is suitably cut out as indicated at 56 in FIG. 2 to accommodate the cap screw 51. A slug discharge bore 57 is disposed in the extension 23 in registry with the opening 41 to discharge slugs resulting from the punching operation.

OPERATION

In the Figures a tube 14 has been inserted over mandrel members 17–18 which disclose said members in tight engagement with the inner surface 15 of the tube 14. However, before the tube can be thus inserted, the wedge block 32 is moved to the dotted line position of FIG. 1 by means of the movement of the ram 39 to the right. The springs 54 are then effective to draw the mandrel members 17–18 together so that they are substantially of less overall outside diameter than the tube inner surface 15. The tube is now inserted over said mandrel members against stop 47 and the tube is supported solidly against lateral movement on the arcuate seat 13 of block 12.

The plate 45 and punch 43 are in a position above the tube and are movable vertically by a suitable power press (not shown). The ram 31 is moved to the left in FIG. 1 by the air cylinder 40 moving arms 34 and wedge member 32 to the solid line position indicated in FIG. 1 whereby the tube is now ready to be pierced. The punch descends and cuts through the tube wall with the resultant slug being discharged through bores 41 and 57. After the punch 43 has been retracted upwardly, the ram is again effective to move the wedge member free of the tapering surface as shown in FIG. 1 in the dotted line position whereupon the mandrel members are withdrawn from the inner surface of the tube and the tube may now be withdrawn from the apparatus.

The mandrel members and block 12 provide a rigid support for the piercing operation and at least several different inner diameter sizes of tubing may be placed over the mandrels and pierced in like manner to pierce the type of opening capable of being formed by the punch.

For smaller inner diameter tubes than that shown, the wedge member 32 is not drawn inwardly as for as shown in FIG. 1, and yet the wedge member is effective to perform its function. Since an air ram is utilized, the ram will merely be restricted in its travel to the left depending on the inner diameter of the tube which determines the extent of such movement.

What is claimed is:

1. Apparatus for piercing a hole through the wall of a tube comprising:
    a base,
    a support mounted on said base,
    said support including an arcuately recessed seating portion adapted to encircle a portion of the wall of said tube in supporting relation,
    a first mandrel member supported on said base in aligned spaced relation relative to said seating portion,
    said first mandrel member having an outer arcuate surface similar in configuration and facing said seating portion and a first inner surface,
    a second mandrel member spaced relative to said first mandrel member and including an outer arcuate surface and an inner second surface spaced from and facing said first inner surface,
    the inner surfaces of one of said mandrel members being tapered in wedge shaped configuration,
    said second mandrel member having a bore including a cutting edge in said outer surface,
    a punch aligned with said cutting edge and adapted to engage and shear a hole through the wall of a tube with said tube being supported on said arcuate seating portion and said mandrel members being positioned within said tube, and
    wedge means movable between and in engagement with the inner surfaces to move said outer surfaces into firm engagement with the inner surface of said tube wall whereby said tube is supported against deformation during said shearing.

2. The invention in accordance with claim 1, one of said mandrel members having opposite side walls connecting said inner tapering surface and said outer surfaces, said side walls being laterally spaced from the inner surface of the wall of a tube to accommodate a variety of tubes of different inner diameters.

3. The invention in accordance with claim 1, said wedge means having an extension extending longitudinally through one end of said tube and power actuated means connected to said extension for reciprocating said wedge means.

4. The invention in accordance with claim 1, said mandrel members having spring means connected thereto adapted to move said members toward one another when said wedge means is moved relative to said inner surfaces whereby said outer surfaces are moved out of engagement with the inner surface of the wall of said tube and said tube may be removed.

5. The invention in accordance with claim 3, said power actuated means including a fluid extensible device.

6. The invention in accordance with claim 3, including spring means connecting said mandrel members to normally bias said inner surfaces toward one another whereby during movement of said wedge means in one direction said outer surfaces of said mandrel members are released from engagement with said walls of said tube.

7. The invention in accordance with claim 5, said fluid extensible device being actuated by a compressible fluid, whereby the movement of said wedge means in one direction in response to actuation of said device is limited by the inner diameter surface of said tube.

* * * * *